US009441652B2

(12) United States Patent
Griess et al.

(10) Patent No.: US 9,441,652 B2
(45) Date of Patent: Sep. 13, 2016

(54) JOINT ASSEMBLY AND METHOD OF ASSEMBLING THE SAME

(71) Applicant: The Boeing Company, Chicago, IL (US)

(72) Inventors: Kenneth H. Griess, Kent, WA (US); Gary Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 629 days.

(21) Appl. No.: 13/906,734

(22) Filed: May 31, 2013

(65) Prior Publication Data
US 2014/0356057 A1    Dec. 4, 2014

(51) Int. Cl.
| F16B 5/00 | (2006.01) |
| B29C 65/48 | (2006.01) |
| B29C 65/00 | (2006.01) |
| B64C 1/06 | (2006.01) |
| B29L 31/00 | (2006.01) |
| B64C 1/00 | (2006.01) |
| B29L 31/30 | (2006.01) |

(52) U.S. Cl.
CPC ............... *F16B 5/00* (2013.01); *B29C 65/48* (2013.01); *B29C 66/02241* (2013.01); *B29C 66/1162* (2013.01); *B29C 66/14* (2013.01); *B29C 66/344* (2013.01); *B29C 66/43* (2013.01); *B29C 66/54* (2013.01); *B29C 66/721* (2013.01); *B64C 1/069* (2013.01); *B29C 65/4835* (2013.01); *B29C 66/7212* (2013.01); *B29C 2793/0036* (2013.01); *B29L 2031/3082* (2013.01); *B29L 2031/7374* (2013.01); *B64C 2001/0072* (2013.01); *Y02T 50/433* (2013.01); *Y10T 29/49826* (2015.01); *Y10T 403/54* (2015.01)

(58) Field of Classification Search
CPC ......... B64C 1/06; B64C 1/068; B64C 1/069; B29C 65/48; B29C 65/56; B29C 66/1122; B29C 66/116; B29C 66/1162; B29C 66/72; B29C 66/721; F16B 11/006
See application file for complete search history.

(56) References Cited

U.S. PATENT DOCUMENTS

| 1,474,774 A | 11/1923 | Fuller |
| 3,504,710 A | 4/1970 | Harry |
| 3,885,071 A | 5/1975 | Blad et al. |
| 7,731,817 B2 | 6/2010 | Hethcock et al. |

(Continued)

FOREIGN PATENT DOCUMENTS

| EP | 2474409 A1 | 7/2012 |
| RU | 2100202 C1 | 12/1997 |

(Continued)

OTHER PUBLICATIONS

EP Extended Search Report for related application 14162072.4 dated Dec. 10, 2014; 8 pp.
Russia Office Action for related matter 12-1735-RU; Application No. 2014122159 dated May 28, 2015; 3 pp.

*Primary Examiner* — Daniel Wiley
(74) *Attorney, Agent, or Firm* — Armstrong Teasdale LLP

(57) ABSTRACT

A joint assembly is that includes a first component and a second component that includes a first portion and a plurality of flexible members extending therefrom for coupling the second component to the first component. The plurality of flexible members are preloaded in a predetermined direction and are configured to flex in a direction opposite to the predetermined direction when coupling the second component to the first component.

19 Claims, 7 Drawing Sheets

(56) References Cited

U.S. PATENT DOCUMENTS

2010/0124659 A1    5/2010  Nelson et al.
2011/0095129 A1*   4/2011  Villares ................... F16B 5/04
                                                          244/119

FOREIGN PATENT DOCUMENTS

| RU | 2010131843 A | 2/2012 |
| WO | 2012141717 A1 | 10/2012 |

* cited by examiner

JOINT ASSEMBLY AND METHOD OF ASSEMBLING THE SAME

BACKGROUND OF THE INVENTION

The field of the present disclosure relates generally to coupling mechanisms and, more specifically, to a preloaded, peel-resistant joint that may be used to bond components together.

At least some known aircraft components may be fabricated from multi-layer laminate structures of non-metallic composite materials such as carbon-fiber-reinforced polymer (CFRP). Composite materials generally have a high strength-to-weight ratio and may be formed in a variety of shapes and sizes. To reduce the weight of an aircraft, the composite materials may be used in combination with metallic materials, such as aluminum, titanium, and/or steel. Reducing the overall weight generally contributes to increasing the fuel efficiency of the aircraft.

One known method of fabricating composite components uses an autoclave molding procedure. Autoclave molding generally includes pre-impregnating layers of composite reinforcement material with a resin, forming the layers into a shape of a desired component, and positioning the desired component in an autoclave. Increasing the temperature and/or pressure within the autoclave cures the resin to provide support to the reinforcement material and to enable the desired shape to be maintained. However, autoclaves generally require a large capital investment, require a large physical footprint, and may be costly to operate.

At least some known aircraft components fabricated from composite materials may be bonded together with an adhesive material. While the adhesive material is generally effective at bonding the components together, disbonding may occur during the service life of the aircraft. For example, disbonding may occur after prolonged use of the aircraft and/or may be caused when a foreign object impacts the materials during flight. Such disbonding may be difficult to detect during scheduled maintenance, and may be difficult to detect via visual inspection.

At least some known non-destructive inspection (NDI) techniques may be used to determine disbonding between components in an assembly. For example, NDI techniques may include ultrasonic inspection, thermographic inspection, and/or inspection with a tap hammer. However, known NDI techniques are generally unable to detect disbonding in weak bonds and/or zero strength bonds (i.e., "kissing bonds") without creating a discontinuity along the bond line to facilitate detection. Such detection difficulties may limit the use of weak bonds and zero strength bonds in certain applications. Further, known NDI techniques may be time-consuming, labor-intensive, and costly to implement.

BRIEF DESCRIPTION OF THE INVENTION

In one aspect, a joint assembly is provided. The joint assembly includes a first component and a second component including a first portion and a plurality of flexible members extending therefrom and configured to flex when coupling the second component to the first component. The plurality of flexible members facilitate restricting an edge disbond from spreading beyond each of the plurality of flexible members.

In another aspect, a fuselage assembly is provided. The fuselage assembly includes a first barrel section that includes a body portion extending from a first end to a second end and a second barrel section including a body portion extending from a first end to a second end and a plurality of flexible members extending from at least one of the first end and said second end and configured to flex when coupling the second barrel section to the first barrel section. The plurality of flexible members facilitate restricting an edge disbond from spreading beyond each of the plurality of flexible members.

In yet another aspect, a method of assembling a joint is provided. The method includes providing a first component including a first portion and a plurality of flexible members extending therefrom, and coupling the plurality of flexible members to a second component. The plurality of flexible members facilitate restricting an edge disbond from spreading beyond each of the plurality of flexible members and are configured to flex when coupling to the second component.

DETAILED DESCRIPTION OF THE INVENTION

Implementations of the present disclosure relate to assemblies and methods that may be used in coupling components together. More specifically, the components may be bonded together with an adhesive, and may include features that facilitate improving bond line control between the components and/or that enable potential disbond locations to be easily detected along a joint created between the components. In the exemplary implementation, at least one of the components includes a first portion and a plurality of flexible members that extend therefrom to couple with another component. The flexible members are preloaded in a predetermined direction and flex in a predetermined direction when coupled to the other component. Moreover, the flexible members are separate from each other to facilitate restricting an edge disbond from propagating along the joint.

Figure 1:
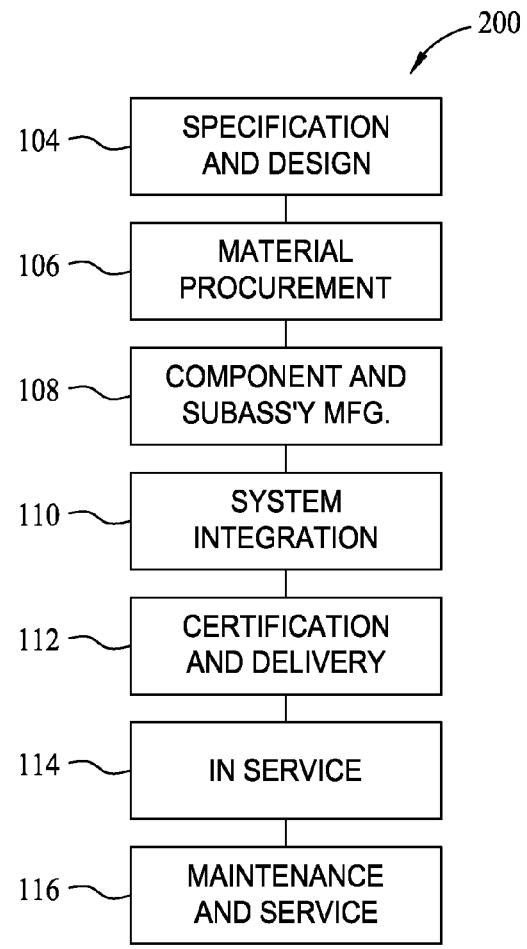
FIG. 1 is a flow diagram of an exemplary aircraft production and service methodology.
Figure 2:
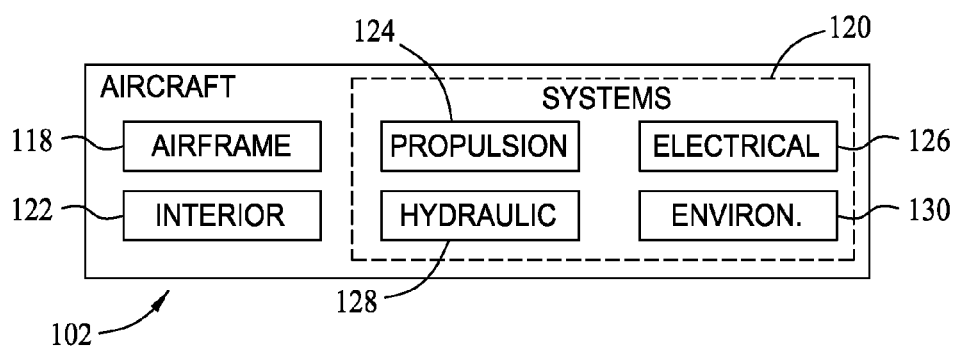
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

Figure 3:
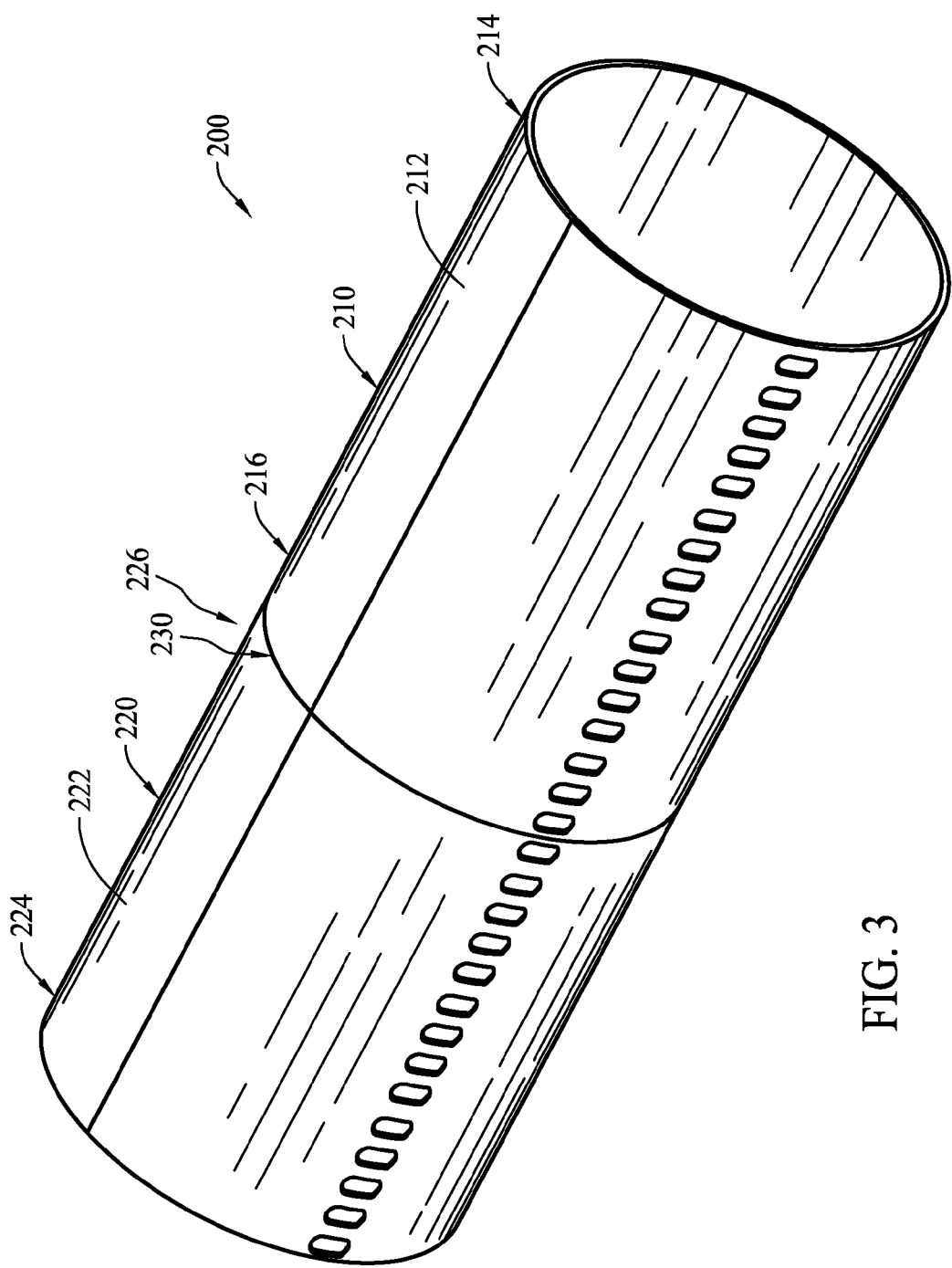
FIG. 3 is a perspective view of an exemplary fuselage assembly.

FIG. 3 is a perspective view of an exemplary fuselage assembly 200. In the exemplary embodiment, fuselage assembly 200 includes a first barrel section 210 and a second barrel section 220. First barrel section 210 includes a body 212 that extends from a first end 214 to a second end 216, and second barrel section 220 includes a body 222 that extends from a first end 224 to a second end 226. In the exemplary embodiment, second ends 216 and 226 of first and second barrel sections 210 and 220 are coupled together at a joint 230 located therebetween.

Figure 4:
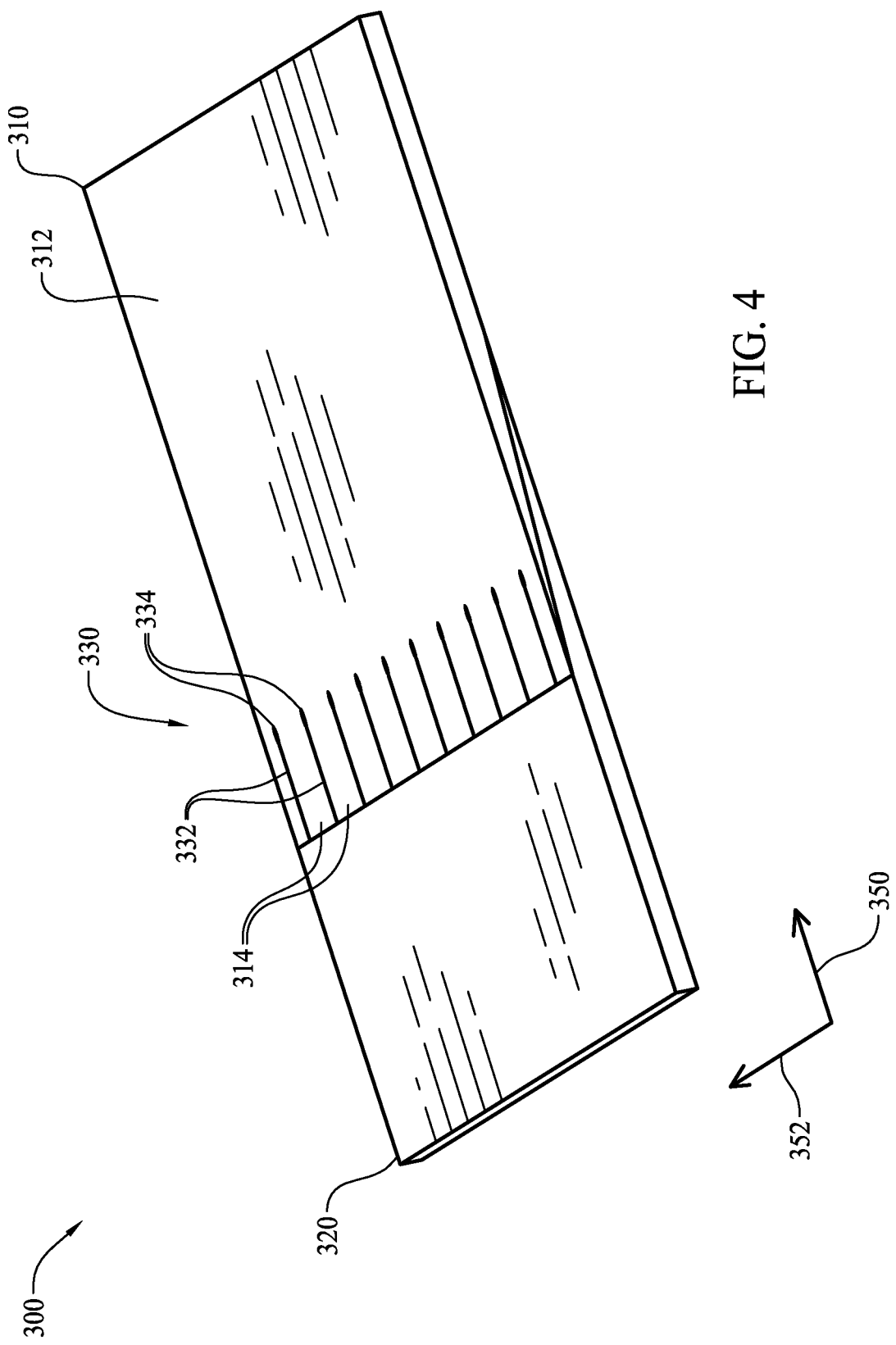
FIG. 4 is a sectional perspective view of an exemplary joint assembly that may be used in assembling the fuselage assembly shown in FIG. 3.
Figure 5:
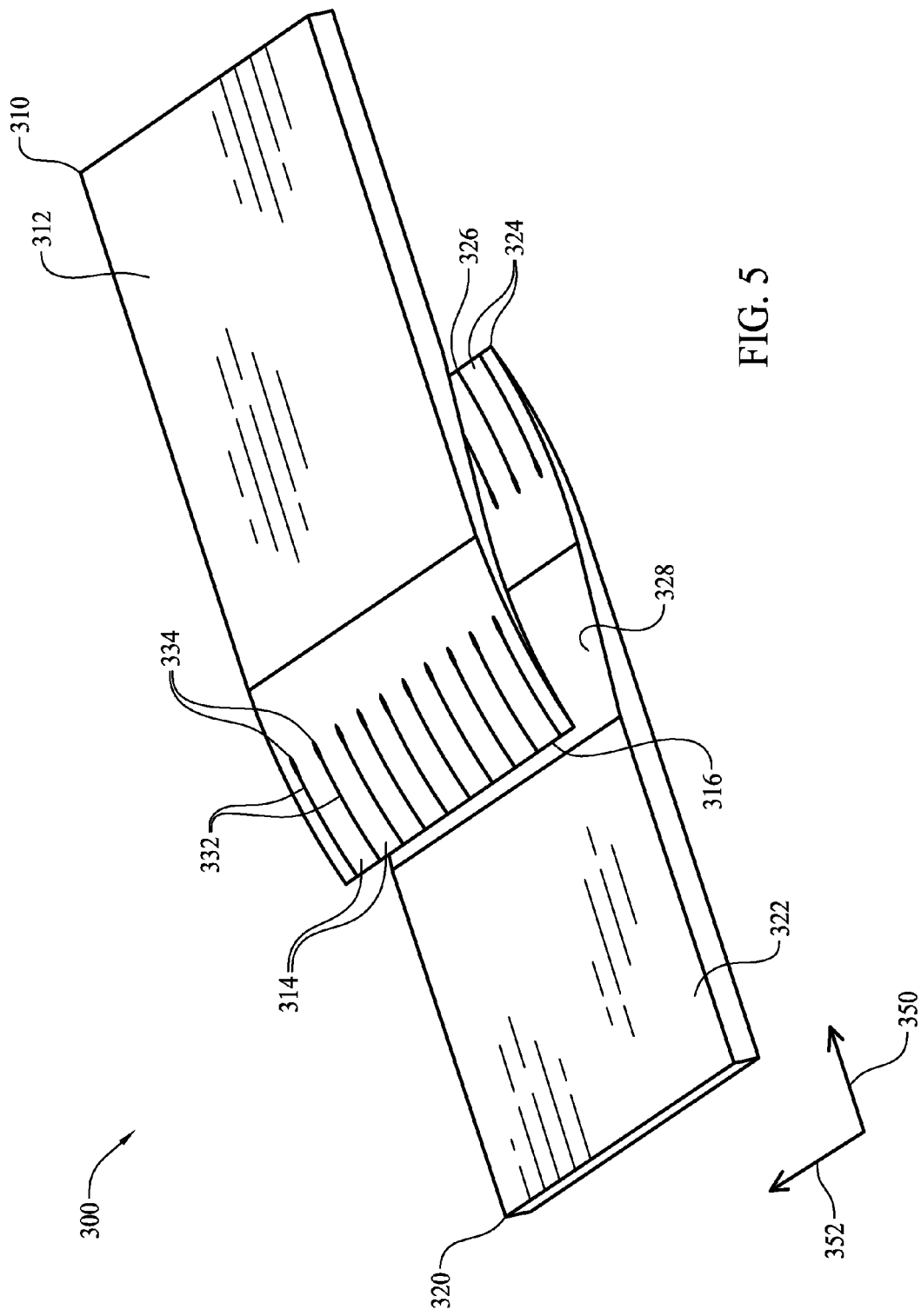
FIG. 5 is an exploded view of the joint assembly shown in FIG. 4.
Figure 6:
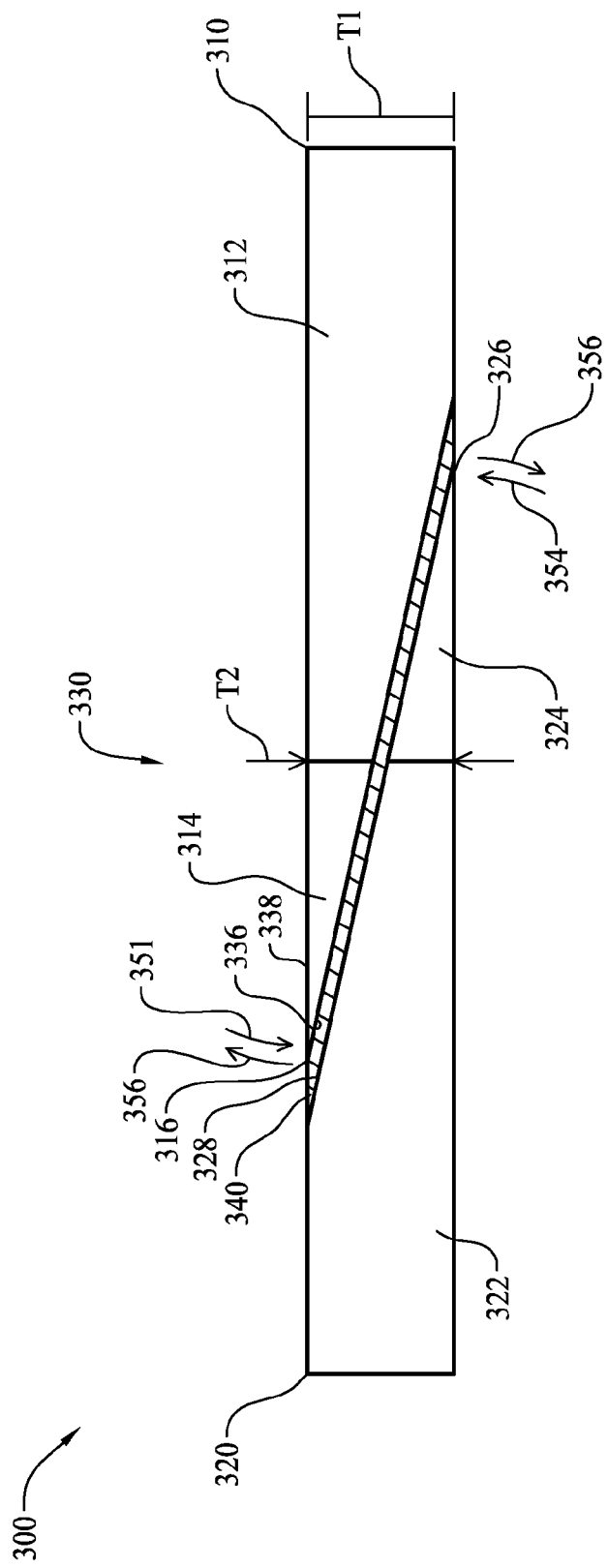
FIG. 6 is a cross-sectional illustration of the joint assembly shown in FIG. 5.

FIG. 4 is a sectional perspective view of an exemplary joint assembly 300 that may be used in assembling fuselage assembly 200 (shown in FIG. 3), FIG. 5 is an exploded view of joint assembly 300, and FIG. 6 is a cross-sectional illustration of joint assembly 300. In the exemplary implementation, joint assembly 300 includes a first component 310 and a second component 320 coupled to first component 310. More specifically, first component 310 and second component 320 are bonded together with a layer 340 of adhesive material at a joint 330 located therebetween. First component 310 and second component 320 may be bonded with any adhesive material that enables joint assembly 300 to function as described herein. Further, in the exemplary implementation, second component 320 includes a bond surface 328 for receiving adhesive layer 340 thereon.

In the exemplary implementation, first component 310 includes a first portion 312 and a plurality of flexible members 314 that extend to an edge 316 of first component 310, and second component 320 may have a substantially similar configuration that is complementary to first component 310. As such, in the exemplary implementation, second component 320 also includes a first portion 322 and a plurality of flexible members 324 that extend to an edge 326 of second component 320. While first component 310 will be described in more detail herein, it should be understood that the same description may apply to second component 320.

In the exemplary implementation, first component 310 and second component 320 are coupled together along joint 330. More specifically, adhesive layer 340 extends at least partially between first component 310 and second component 320 to couple first component 310 and second component 320 together. Further, first portion 312 has a substantially uniform thickness T1 and first component 310 is tapered to have a reduced thickness from first portion 312 to edge 316. Because first component 310 and second component 320 are substantially similar and are complementary to each other, joint assembly 300 has a substantially uniform thickness along joint 330. For example, in the exemplary implementation, joint 330 has a thickness T2 that is substantially similar to thicknesses T1. As such, tapering a thickness of first component 310 facilitates improving a gradual load transition into joint 330 in a longitudinal direction 350.

In some implementations, flexible members 314 extend from first portion 312 to couple to second component 320. More specifically, flexible members 314 extend from first portion 312 to mate with bond surface 328 defined on second component 320, and adhesive layer 340 couples flexible members 314 to bond surface 328. Further, adjacent flexible members 314 are separated by a slit 332 and an aperture 334 defined therebetween. Slits 332 and apertures 334 facilitate increasing the disbond-isolation capability along joint 330 by restricting an edge disbond from spreading beyond each flexible member 314. More specifically, in the exemplary implementation, each flexible member 314 is isolated from an adjacent flexible member 314 by extending slit 332 to edge 316 of first component 310. Isolating flexible members 314 facilitates restricting disbond growth from propagating along joint 330 in a transverse direction 352. Isolating flexible members 314 also enables each flexible member 314 to compensate for irregularities and/or distortions in bond surface 328 of second component 320.

In some implementations, flexible members 314 facilitate providing a smooth load transition and reduced stress state along joint 330. For example, axial loading in flexible members 314 may extend in longitudinal direction 350, and off-axis loading in flexible members 314 may extend in transverse direction 352. Segmenting flexible members 314 may result in flexible members 314 having difficulty handling off-axis loading along joint 330. As such, a stronger bond is formed along joint 330 because of the improved load transition and lower stress state in flexible members 314.

Flexible members 314 may be fabricated from any material that enables joint assembly 300 to function as described herein. An exemplary material includes, but is not limited to, a composite material such as carbon fiber reinforced polymer (CFRP). Further, flexible members 314 are preloaded in a predetermined direction before being coupled to second component 320. More specifically, flexible members 314 are preloaded in a predetermined direction that is either towards second component 320 or away from second component 320. Flexible members 314 may then be flexed in an opposing direction from the predetermined direction when first component 310 and second component 320 are coupled together.

In one implementation, flexible members 314 are preloaded in a predetermined direction 354 before being coupled to second component 320. More specifically, flexible members 314 are bent towards second component 320 to be preloaded in predetermined direction 354. Flexible members 314 may then flex away from second component 320 in an opposing direction 356 from predetermined direction 354 when first component 310 and second component 320 are coupled together. As such, flexing flexible members 314 in opposing direction 314 defines a tension surface 336 and a compression surface 338 that opposes tension surface 336 on first component 310. Tension surface 336 may then be coupled to second component 320 via adhesive layer 340.

In one implementation, flexible members 314 may facilitate reducing a load to be applied across flexible members 314 that may be necessary to achieve a sufficient bond along joint 330 and/or may facilitate improving bond line control along joint 330. For example, in one implementation, the additional load provided by preloaded flexible members 314 may enable first component 310 and second component 320 to be bonded without the use of an autoclave (not shown). More specifically, adhesive layer 340 may be applied to bond surface 328, flexible members 314 may be oriented such that tension surface 336 couples to adhesive layer 340, and a mechanical clamp (not shown) may be used to hold flexible members 314 in place as adhesive layer 340 cures. In one implementation, adhesive layer 340 may be cured at an elevated temperature and for a predetermined duration in an oven (not shown). As such, the combined load provided by the mechanical clamp and the preloading of flexible members 314 may enable bonding first component 310 and second component 320 without the additional pressure and/or costs associated with autoclave molding procedures.

Figure 7:
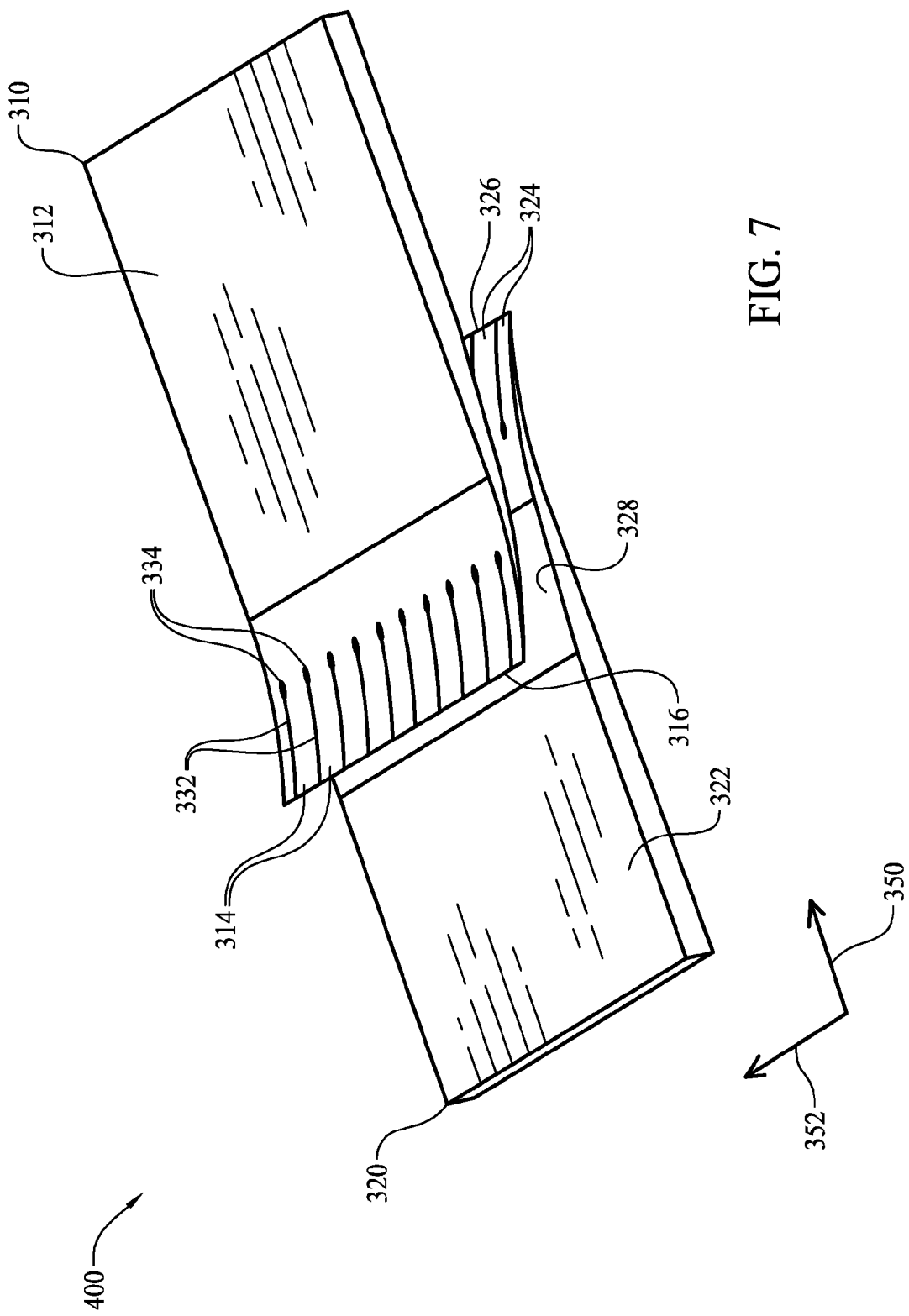
FIG. 7 is an exploded view of an alternative joint assembly that may be used in assembling the fuselage assembly shown in FIG. 3.
Figure 8:
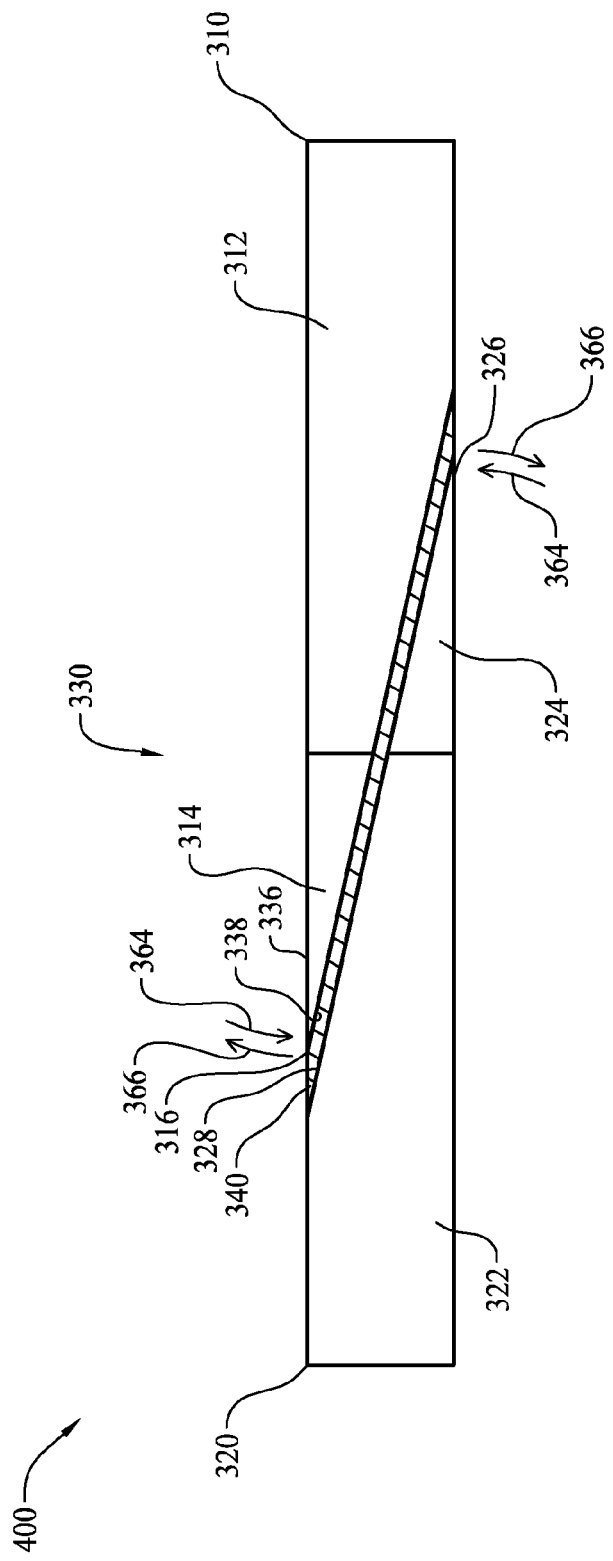
FIG. 8 is a cross-sectional illustration of the joint assembly shown in FIG. 7.

FIG. 7 is an exploded view of an alternative joint assembly 400 that may be used in assembling fuselage assembly 200 (shown in FIG. 3), and FIG. 8 is a cross-sectional illustration of joint assembly 400. In the exemplary implementation, flexible members 314 are preloaded in a predetermined direction 364 before being coupled to second component 320. More specifically, flexible members 314 are bent away from second component 320 to be preloaded in predetermined direction 364. Flexible members 314 may then flex towards second component 320 in an opposing direction 366 from predetermined direction 364 when first component 310 and second component 320 are coupled together. As such, flexing flexible members 314 in opposing direction 366 defines compression surface 338 and tension surface 336 that opposes compression surface 338 on first component 310. Compression surface 338 may then be coupled to second component 320 via adhesive layer 340.

In one implementation, flexible members 314 facilitate determining disbond locations between first component 310 and second component 320 along joint 330. For example, disbonding may occur as a result of prolonged use of adhesive layer 340 and/or an impact by a foreign object (not shown). Because flexible members 314 are preloaded in predetermined direction 364, disbonding along joint 330 may cause one or more flexible members 314 to uncouple and flex away from second component 320 in predetermined direction 364. As such, flexible members 314 that are uncoupled from second component 320 may provide a visual indication of localized disbonding along joint 330 and/or may enable disbond detection with a non-destructive imaging technique.

The assemblies and methods described herein enable components to be coupled together in an efficient manner. More specifically, the assemblies described herein include a plurality of flexible members that extend from one component to couple to another component. The flexible members are preloaded in a predetermined direction that facilitates increasing a bond load across a joint defined therebetween, for example. In addition, preloading the flexible members away from the other component enables disbond locations to be easily determined along the joint. As such, the flexible members facilitate coupling components together with improved bond line control and enable a simplified bonding process that enables disbond locations to be easily determined along the joint.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A joint assembly comprising:
   a first component comprising a first barrel section having a first edge portion; and
   a second component comprising a second barrel section having a second edge portion with a plurality of flexible members extending longitudinally therefrom that are configured to flex when coupling said flexible members to said first edge portion of said first component, wherein said plurality of flexible members are configured to individually uncouple from said first component such that a disbond between said first component and said second component is restricted from spreading laterally to adjacent flexible members of said plurality of flexible members; and
   wherein a joint formed by said first and second edge portions defines a substantially uniform thickness.

2. The assembly in accordance with claim 1, wherein at least some of said plurality of flexible members are tapered to a tip of said second component having a reduced thickness.

3. The assembly in accordance with claim 1, wherein said first component and said second component are each tapered such that a joint defined between said first and second components is formed with a substantially uniform thickness.

4. The assembly in accordance with claim 1, wherein said plurality of flexible members are preloaded in a predetermined direction and are configured to flex in a direction opposite to the predetermined direction when coupling said second component to said first component.

5. The assembly in accordance with claim 4, wherein said plurality of flexible members are bent towards said first component to be preloaded in the predetermined direction.

6. The assembly in accordance with claim 5, wherein said plurality of flexible members are flexed in the direction opposite to the predetermined direction to apply tension to said first component.

7. The assembly in accordance with claim 4, wherein said plurality of flexible members are bent away from said first component to be preloaded in the predetermined direction.

8. The assembly in accordance with claim 7, wherein said plurality of flexible members are flexed in the direction opposite to the predetermined direction to apply compression to said first component.

9. The assembly in accordance with claim 1, wherein said plurality of flexible members are separated by a gap defined between adjacent pairs of said plurality of flexible members.

10. The assembly in accordance with claim 1, wherein said plurality of flexible members are integrally formed with said second edge portion.

11. A fuselage assembly comprising:
a first barrel section comprising a body portion extending from a first end to a second end; and
a second barrel section comprising a body portion extending from a first end to a second end and a plurality of flexible members extending longitudinally from at least one of said first end and said second end of said second barrel section, wherein said plurality of flexible members are configured to flex when coupling said flexible members to one of said first and second ends of said first barrel section, and wherein said flexible members are configured to individually uncouple from said first component such that a disbond between said first barrel section and said second barrel section is restricted from spreading laterally to adjacent flexible members of said plurality of flexible members; and
wherein a joint formed by said first and second barrel sections defines a substantially uniform thickness.

12. The assembly in accordance with claim 11, wherein said first barrel section comprises a bond surface that is configured to mate with said plurality of flexible members.

13. The assembly in accordance with claim 11, wherein said plurality of flexible members are fabricated from a composite material.

14. The assembly in accordance with claim 11, wherein said plurality of flexible members are tapered to facilitate improving a gradual load transition into a joint defined between said first barrel section and said second barrel section.

15. A method of assembling a joint, said method comprising:
providing a first component comprising a first barrel section including a first edge portion and a plurality of flexible members extending longitudinally therefrom;
providing a second component comprising a second barrel section including a second edge portion; and
coupling the plurality of flexible members to said second edge portion of said second component, wherein said flexible members are configured to flex when coupling said flexible members to the second edge portion of said second component, wherein the plurality of flexible members are configured to individually uncouple from the first component such that a disbond between the first component and the second component is restricted from spreading laterally to adjacent flexible members of the plurality of flexible members, wherein a joint formed by said first and second edge portions defines a substantially uniform thickness.

16. The method in accordance with claim 15 further comprising preloading the plurality of flexible members in a predetermined direction towards the second component.

17. The method in accordance with claim 15 further comprising preloading the plurality of flexible members in a predetermined direction that is away from the second component.

18. The method in accordance with claim 15, wherein coupling the plurality of flexible members comprises applying an adhesive material to a bond surface defined along the second component.

19. The method in accordance with claim 15, wherein defining a gap comprises extending a slit to an edge of the first component such that the plurality of flexible members are separated from each other.

* * * * *